May 28, 1963 R. S. HARLEY ET AL 3,091,368
POWDER MEASURING DEVICE
Filed March 1, 1961 2 Sheets-Sheet 1

Inventors:
Robert Sidney Harley,
Carl Leon Miller,
Clarence Eugene North,
by John H. Lewis Jr.
John W. Phipps
Attorneys.

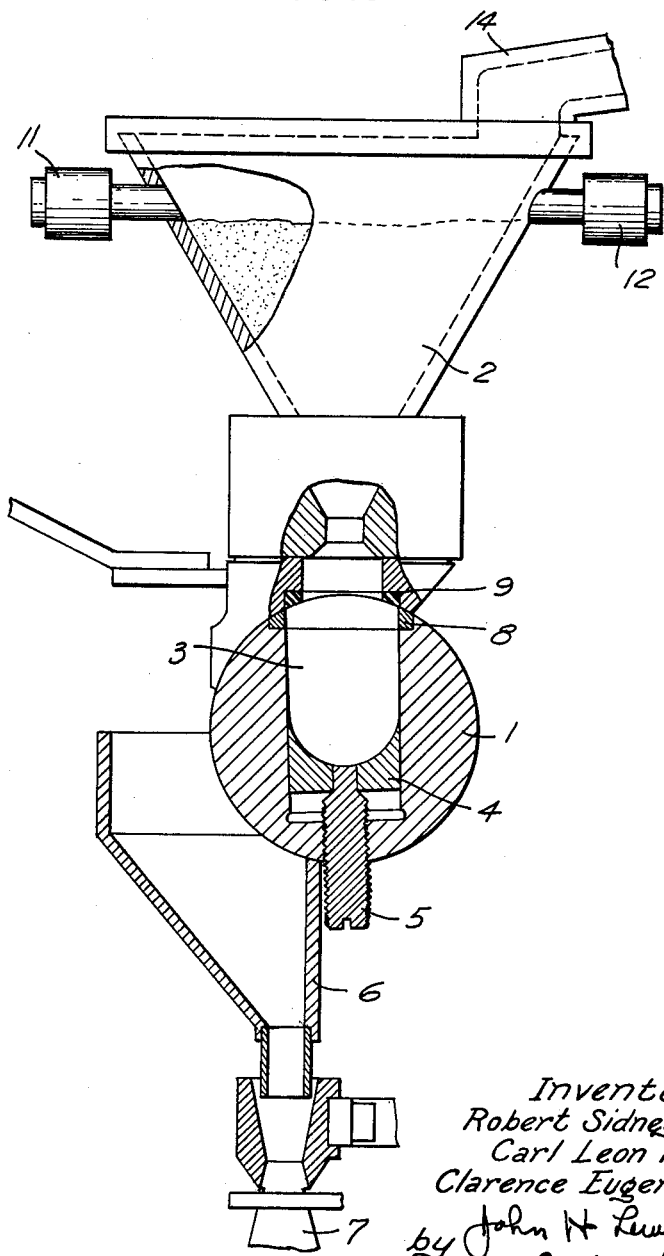

United States Patent Office 3,091,368
Patented May 28, 1963

3,091,368
POWDER MEASURING DEVICE
Robert Sidney Harley, Independence, Carl Leon Miller, Kansas City, and Clarence Eugene North, Independence, Mo., assignors to Remington Arms Company, Inc., Bridgeport, Conn., a corporation of Delaware
Filed Mar. 1, 1961, Ser. No. 92,673
4 Claims. (Cl. 222—56)

This invention relates to an improved volumetric measuring device which is capable of reproducibly measuring charges of fluent material with great accuracy.

Although such a measuring device has utility in many fields, this invention is particularly concerned with the measurement of charges of smokeless powder for the loading of small arms ammunition.

Certain precision ammunition is now required to be loaded with the charges individually measured with hand-operated precision scales, such as the Gunderson electronic scale. The working tolerance with a charge of about 112 grains is plus or minus .3 grain, which has not been possible to attain with the available prior art powder measuring devices. The attainment of accuracy greater than can be attained in existing automatic equipment is the principal object of this invention.

The following features contribute to the elimination of variables in the powder measuring processes:

(1) The shape of the volumetric chamber in the measuring valve provides a minimum of surface area and an absence of any sharp angles which tend to restrict the uniform flow of powder into the measuring chamber;

(2) The powder is vibrated during the period of charging, to provide consistent density in the volumetric measuring chamber during each cycle;

(3) A controlled height of the column of powder above the measuring chamber during charging is automatically maintained.

The exact nature of the invention as well as other objects and advantages thereof will become apparent from consideration of the following specification, referring to the attached drawing, in which:

FIG. 2 is an enlarged cross-sectional view of a portion of the mechanism shown in FIG. 1, shown here in powder receiving position.

Figure 1:
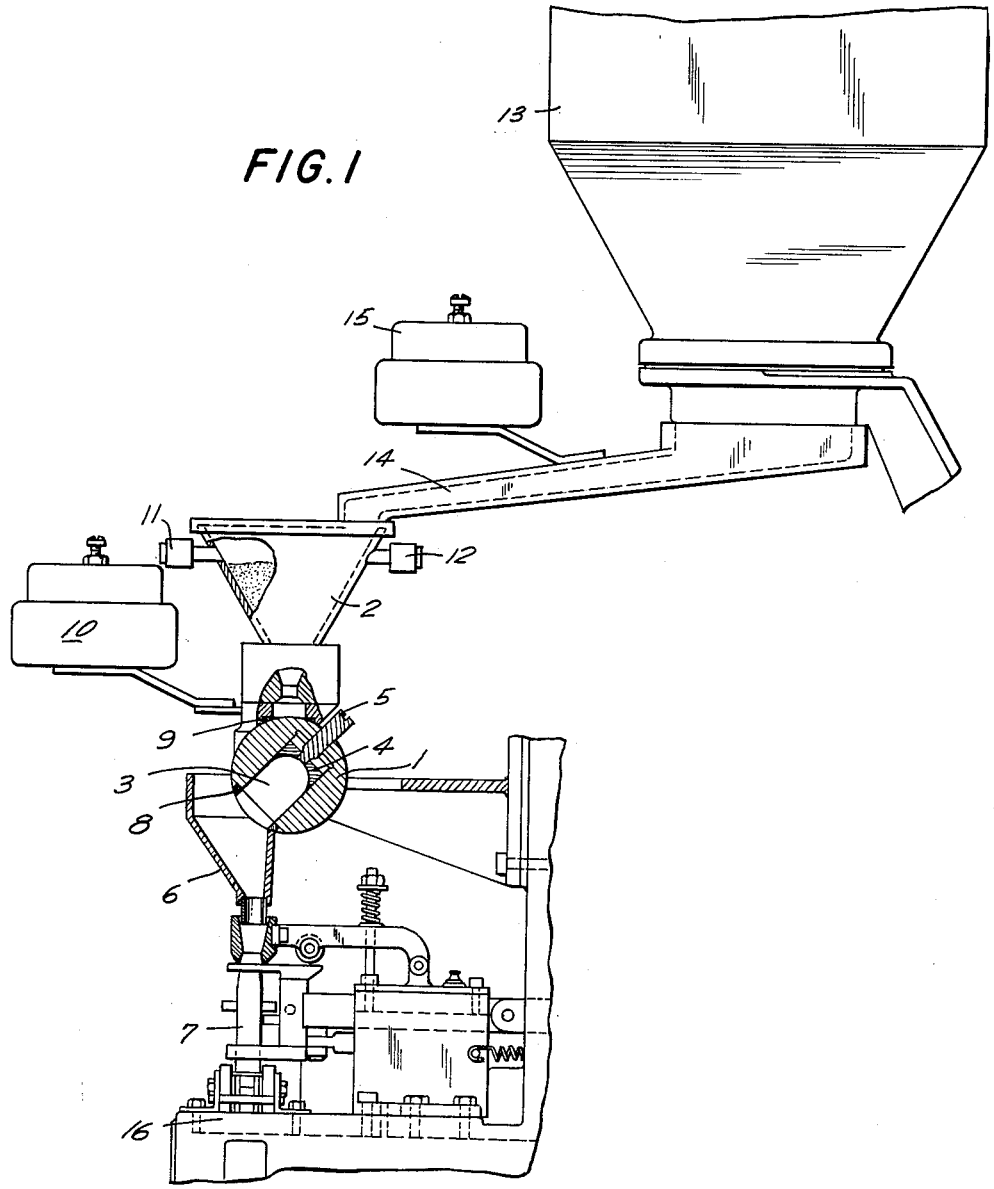
FIG. 1 is a side elevation, partially in section, through an automatic charging machine embodying the invention.

Referring to the drawing by characters of reference, it will be seen that the powder measuring chamber is provided in a shaft 1 which is suitably journalled for rotation about a horizontal axis and which forms in effect a precisely fitted rotatable bottom in a powder funnel 2. A generally diametrally extending cylindrical bore in the shaft 1 provides a measuring cavity 3 which is fitted with a close fitting bottom plate 4. This bottom plate is shaped to define a hemispherical bottom in the measuring cavity and may be adjustably positioned therein by the screw 5. The diameters of the shaft 1 and of the measuring cavity are so selected that for the average charge of powder to be thrown the cavity provides a shape in which the dimensions of the height, width, and depth are substantially the same. This shape provides a maximum volume with a minimum of powder contact area and avoids any sharp angles or corners in which powder might not pack uniformly.

In the position of the shaft 1 shown in FIG. 2, the measuring cavity is positioned to receive powder from the funnel 2, and in the position shown in FIG. 1 the shaft has been rotated by about 135° to discharge the powder through a funnel 6 to a waiting cartridge 7. It will be noted that the screw 5 acts as a limit stop to control the two end positions of the shaft 1.

Hardened inserts 8 and 9 define the edges of the measuring cavity 3 and the bottom of the powder funnel 2, and provide wear resistant surfaces which mate together in cutting off a charge of powder as the shaft is rotated.

Consistent filling of the measuring cavity is assured by the application of a vibratory packing force during the interval in which the measuring cavity 3 is being filled. This can be achieved by the provision of an electric vibrator 10 of known type secured to the funnel 2. For the utmost in accuracy, this vibrator should function for a uniform time interval each time the measuring cavity is positioned to receive powder. Known electrical expedients may be utilized to close the circuit to the vibrator each time the measuring cavity is turned to position to receive powder. Similarly, known electrical delay devices may be utilized to turn off the vibrator after a predetermined number of seconds or other precisely controlled interval. Obviously, considerable benefit will be derived from the vibrator if it is left on continuously or if it is turned off and on as the measuring cavity moves into and out of powder receiving position, particularly if the mechanism is operating continuously in a regular cycle motion.

Consistency in filling is also assisted by the maintenance of a controlled height of powder in the measuring funnel 2. This may be achieved by the provision of a light source 11 at one side of the funnel and a photo electric cell unit 12 at the other side of the funnel. In known manner, the interruption of the light beam by the filling of the hopper functions to operate relay means which will stop the flow of powder into the funnel and the re-establishment of the light beam permits resumption of the feed of powder.

A convenient device for feeding powder to the funnel 2 may be found in a substantially conventional vibratory powder feeder which comprises a hopper 13 closed at the bottom with a delivery chute 14. The chute is mounted at an incline less than the angle of repose of the powder, so that in a static condition powder will not flow from the hopper. A vibrator unit 15 may be provided, to vibrate the chute and/or hopper and will cause the powder to flow through the chute at a rate determined by the frequency and/or amplitude of the applied vibration. A unit such as that illustrated will serve, or any commercial vibratory powder feeder such as a "Syntron" unit will do as well. The photo-electric means referred to in the preceding paragraph can be used to turn the vibratory feeder off and on.

Such a powder measuring device will provide improved accuracy for hand loading equipment or may as suggested in FIG. 1 be applied to such automatic equipment as the Waterbury-Farrel straight line loading machine illustrated in US Patent No. 1,602,334, to Candee, wherein cartridge cases are transferred in a straight line along a bed 16 of a loading machine where the operations of loading a complete round of ammunition are performed. FIG. 1 illustrates a unit suitable for application to the powder charging station of such a loading machine.

Although a preferred embodiment has been illustrated here, it will be obvious that variations therein may be made within the scope of the claims appended hereto.

We claim:
1. A powder measuring device comprising a hopper having a gravity flow discharge means at its bottom, a cylindrical drum rotatably mounted under said discharge means, a measuring chamber defined by a diametral chamber extending substantially perpendicular to the axis of rotation of said drum, said chamber having a hemispherical bottom of substantially the same diameter as said chamber defined in an adjustably positioned plug which is movable in said chamber to vary the volume of said chamber, a case at least partially surrounding said drum provided with an opening communicating between said discharge means and an open end of the said measuring chamber, means to rotate said drum between a position in which the open end of the diametrally extending chamber is in communication through said opening with said discharge means and a position in which said open end is downwardly disposed to dump a charge contained in said chamber, electro-mechanical vibrating means operatively connected to said case to assure positive and consistent filling of said measuring chamber, and means for maintaining a controlled height of powder in said hopper.

2. A device as recited in claim 1 in which means is provided to move said adjustably positioned plug, said plug moving means including means to limit rotational movement of said drum.

3. A device as recited in claim 2 wherein said limiting means comprises an elongated threaded means having one end connected to said adjustable plug and the opposite end extending outwardly of the periphery of said drum.

4. A device as recited in claim 3 wherein said rotatable drum is mounted on a frame, said frame and said case cooperating to permit uninterrupted rotation of said drum from a first or loading position where said chamber open end is vertically positioned under said hopper discharge means to a second or load dumping position approximately 135 degrees from the first position, means on said frame to limit drum rotation in one direction, and means on said case to limit drum rotation in the other direction.

References Cited in the file of this patent
UNITED STATES PATENTS

| | | |
|---|---|---|
| 59,703 | York | Nov. 13, 1866 |
| 2,381,505 | Lindholm | Aug. 7, 1945 |
| 2,550,827 | Lachmiller | May 1, 1951 |
| 2,792,030 | Wahl | May 14, 1957 |

FOREIGN PATENTS

| | | |
|---|---|---|
| 538,670 | Italy | Jan. 28, 1956 |